(12) United States Patent
Szczepanski

(10) Patent No.: US 10,408,112 B2
(45) Date of Patent: Sep. 10, 2019

(54) EMISSIONS CONTROL SUBSTRATE

(71) Applicant: DENSO International America, Inc., Southfield, MI (US)

(72) Inventor: Edward Szczepanski, Grosse Pointe Woods, MI (US)

(73) Assignee: DENSO International America, Inc., Southfield, MI (US)

(*) Notice: Subject to any disclaimer, the term of this patent is extended or adjusted under 35 U.S.C. 154(b) by 238 days.

(21) Appl. No.: 15/237,819

(22) Filed: Aug. 16, 2016

(65) Prior Publication Data

US 2018/0051614 A1 Feb. 22, 2018

(51) Int. Cl.
| | |
|---|---|
| *F01N 9/00* | (2006.01) |
| *B01D 53/94* | (2006.01) |
| *F01N 3/027* | (2006.01) |
| *F01N 3/20* | (2006.01) |
| *F01N 3/28* | (2006.01) |
| *F01N 3/022* | (2006.01) |

(52) U.S. Cl.
CPC .......... *F01N 9/002* (2013.01); *B01D 53/9495* (2013.01); *F01N 3/027* (2013.01); *F01N 3/0222* (2013.01); *F01N 3/2026* (2013.01); *F01N 3/2807* (2013.01); *F01N 3/2825* (2013.01); *F01N 3/2828* (2013.01); *B01D 53/945* (2013.01); *B01D 2255/20* (2013.01); *F01N 2330/06* (2013.01); *F01N 2900/0408* (2013.01); *F01N 2900/0602* (2013.01); *F01N 2900/16* (2013.01); *F01N 2900/1606* (2013.01); *Y02T 10/26* (2013.01); *Y02T 10/47* (2013.01)

(58) Field of Classification Search
CPC .............. B01D 53/945; B01D 53/9495; B01D 2255/20; F01N 3/0222; F01N 3/027; F01N 3/2026; F01N 3/2807; F01N 3/2825; F01N 3/2828; F01N 9/002; F01N 2330/06; F01N 2900/0408; F01N 2900/0602; F01N 2900/16; F01N 2900/1606
See application file for complete search history.

(56) References Cited

U.S. PATENT DOCUMENTS

| | | | |
|---|---|---|---|
| 8,823,400 B2 * | 9/2014 | Hocken ............... | F02D 41/1466 324/691 |
| 9,605,578 B1 * | 3/2017 | Qi ......................... | F01N 9/002 |
| 2003/0106308 A1 * | 6/2003 | Gabe .................... | F01N 3/0222 60/295 |
| 2009/0126458 A1 * | 5/2009 | Fleischer ............. | G01N 15/0656 73/28.01 |

FOREIGN PATENT DOCUMENTS

JP 58020919 A * 2/1983 ............. F01N 3/023

OTHER PUBLICATIONS

Machine Translation of JP-58020919-A (Haruhiko).*

* cited by examiner

*Primary Examiner* — Brandon D Lee
(74) *Attorney, Agent, or Firm* — Harness, Dickey & Pierce, P.L.C.

(57) ABSTRACT

An emissions control substrate having a circuit in sidewalls thereof. The circuit changes resistance in response to accumulation of particles on the sidewalls that inhibits flow of exhaust through the emissions control substrate.

17 Claims, 4 Drawing Sheets

EMISSIONS CONTROL SUBSTRATE

FIELD

The present disclosure relates to an emissions control substrate.

BACKGROUND

This section provides background information related to the present disclosure, which is not necessarily prior art.

Emissions control substrates are often used with engine exhaust systems to treat the exhaust before it is released into the atmosphere. For example, a catalytic converter substrate is often used with automobile exhaust systems to catalyze a redox reaction, thereby converting CO into $CO_2$, and converting $NO_X$ into $N_2$ and $O_2$. A particulate filter substrate is often used to treat exhaust gas from a diesel engine by filtering particulate matter out of the exhaust. While existing emissions control substrates are suitable for their intended use, they are subject to improvement. The present teachings provide for emissions control substrates that address various needs in the art, and provide numerous unexpected and advantageous results.

SUMMARY

This section provides a general summary of the disclosure, and is not a comprehensive disclosure of its full scope or all of its features.

The present teachings provide for an emissions control substrate having a circuit in sidewalls thereof. The circuit changes resistance in response to accumulation of particles on the sidewalls that inhibits flow of exhaust through the emissions control substrate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
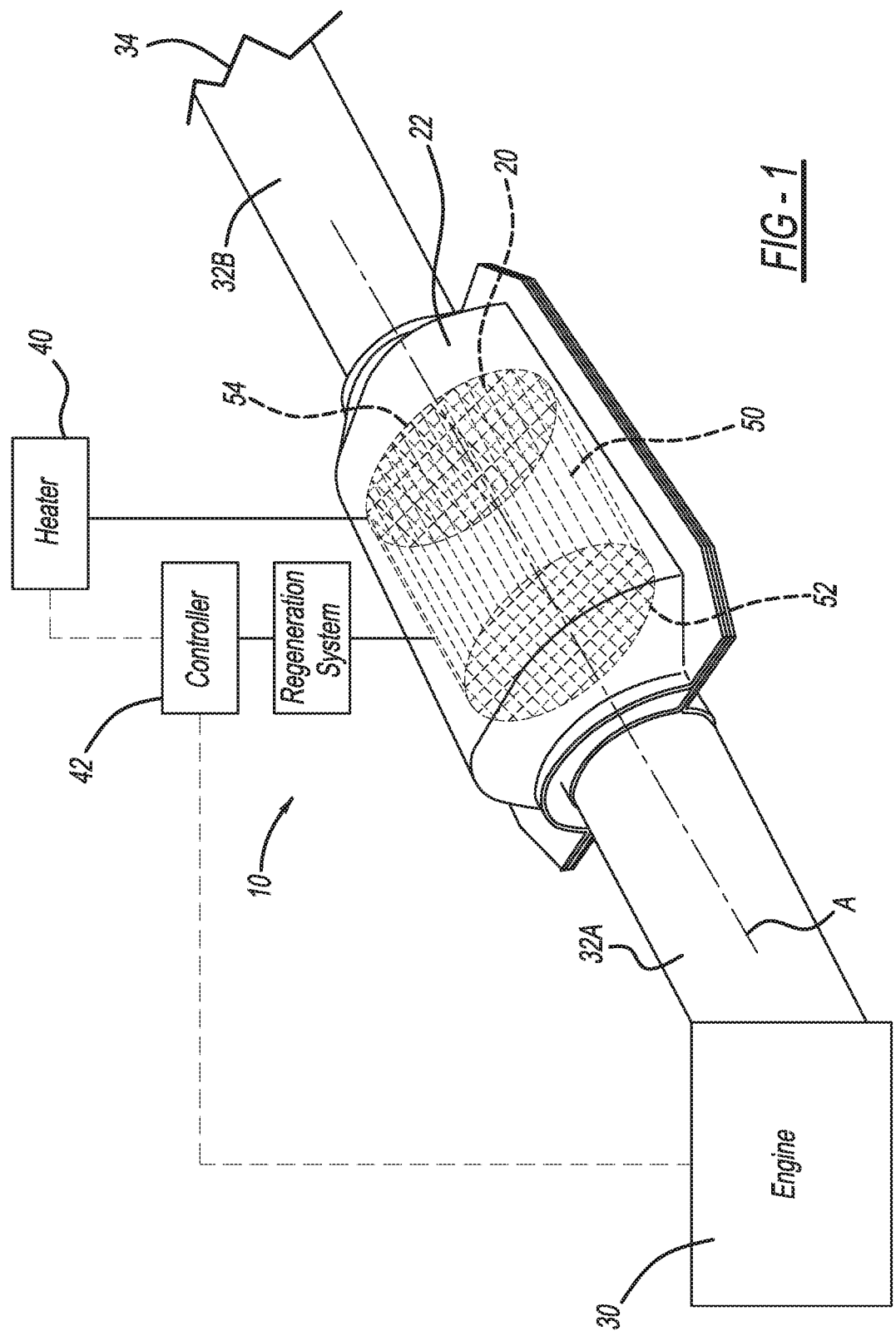
FIG. 1 illustrates an exhaust system including an emissions control substrate according to the present teachings.

With initial reference to FIG. 1, an exhaust system according to the present teachings is generally illustrated at reference numeral 10. The exhaust system 10 generally includes an emissions control substrate 20 housed within a substrate chamber 22. The substrate 20 is arranged to treat exhaust from an engine 30, which is directed to the substrate 20 through a first exhaust conduit portion 32A. For example, the substrate 20 can be configured as a catalytic converter or a particulate matter filter, such as a diesel particulate filter, gasoline engine particulate filter, or any other suitable particulate filter. Exhaust having passed through the substrate 20 flows through a second exhaust conduit portion 32B to an outlet 34 of the exhaust system 10. The outlet 34 can be in the form of, for example, a vehicle tail pipe.

The exhaust system 10 further includes a heater 40. The heater 40 can be any suitable heater configured to heat the substrate 20. When the substrate 20 is used as a particulate filter, the heater 40 can be activated to heat the substrate 20 and facilitate regeneration. When the substrate 20 is used as a catalytic converter, heating the substrate 20 with the heater can facilitate a redox reaction to treat toxic pollutants in exhaust gas prior to release of the exhaust to the atmosphere.

The exhaust system 10 further includes a controller 42. The controller 42 can be any suitable controller configured to control activation of the heater 40 and control the engine 30. The controller 42 can also be configured to monitor resistance of the substrate 20. The controller 42 is described further herein.

The exhaust system 10 can be any suitable vehicle exhaust system, and the engine 30 can be any suitable vehicle engine. For example, the exhaust system 10 can be used with passenger vehicles, sport utility vehicles, recreational vehicles, military vehicles, mass transit vehicles, locomotives, watercraft, aircraft, etc. The exhaust system 10 can also be configured for controlling emissions from any other suitable engine, such as any other suitable internal combustion engine, generator, military equipment, mining equipment, building equipment, etc.

The substrate 20 defines a plurality of channels 50, which are adjacent to one another and extend between a first end 52 and a second end 54 of the substrate 20. As exhaust passes through the substrate chamber 22 from the first exhaust conduit portion 32A to the second exhaust conduit portion 32B, exhaust enters the substrate 20 at the first end 52 thereof, which is an upstream end, and exits the substrate 20 at the second end 54 thereof, which is a downstream end. The exhaust is treated as it passes through the substrate 20, and ultimately exits the exhaust system 10 through the outlet 34, which can be a tail pipe.

Figure 2:
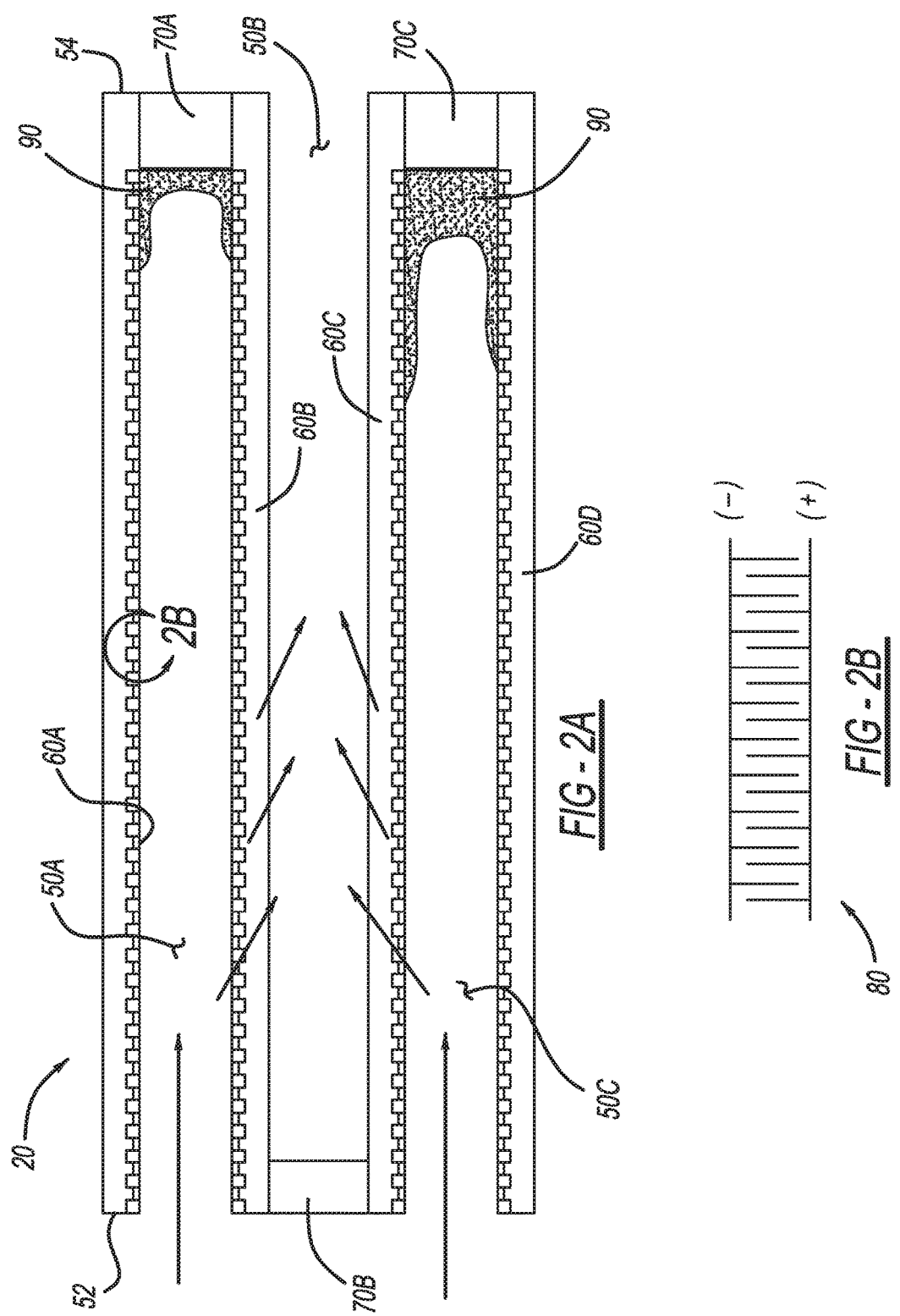
FIG. 2A is a cross-sectional view of channels of an emissions control substrate according to the present teachings.
FIG. 2B illustrates a circuit according to the present teachings at area 2B of FIG. 2A.

In the example of FIGS. 2A and 2B, the substrate 20 is configured as a filter, such as a diesel particulate filter. The substrate 20 includes a plurality of channels, including a first channel 50A, a second channel 50B, and a third channel 50C. The first channel 50A is defined by a first sidewall 60A and a second sidewall 60B. The second channel 50B is defined by the second sidewall 60B and a third sidewall 60C. The third channel 50C is defined by the third sidewall 60C and a fourth sidewall 60D.

The first channel 50A extends from the first end 52 towards the second end 54 to a first plug 70A. The first plug 70A can be at the second end 54, or upstream of the second end 54. The first plug 70A blocks the flow of exhaust entirely through the first channel 50A. Due to the first plug 70A, exhaust is forced from the first channel 50A, through the sidewall 60B, and into the second channel 50B. The second channel has a second plug 70B at the first end 52, but not downstream of the second plug 70B. Therefore, exhaust can flow from the second channel 50B out of the substrate 20 and to the second exhaust conduit portion 32B, from which the exhaust exits the outlet 34. Similar to the first channel 50A, the third channel 50C includes a third plug 70C. Due to the third plug 70C, exhaust cannot pass entirely through the third channel 50C. Instead, exhaust within the third channel 50C passes through the sidewall 60C and into the second channel 50B, from which exhaust exits the substrate 20.

When the substrate 20 is configured as a particulate matter filter, such as a diesel particulate matter filter, the sidewalls 60A-60D can be made of any material that is suitable to filter (and thus trap therein) particulate matter from exhaust passing through the sidewalls 60A-60D. The particulate matter filtered can be any atmospheric pollutant including hydrocarbons or other chemicals, such as soot, ash, dust, fumes, smog, etc., for example. The sidewalls 60A-60D can thus include any suitable ceramic material, such as cordierite. Over time, a buildup of particles 90, which may include particulate matter or any other particles, may occur within the channels 50, such as the buildup of particles 90 of channels 50A and 50C illustrated in FIG. 2A. This buildup of particles 90 can block passage of exhaust through at least a portion of the sidewalls 60A-60D, thereby reducing the effectiveness of the emissions control substrate 20.

With particular reference to FIG. 2B, the substrate 20 further includes a circuit 80, or any other suitable sensor, configured to measure buildup of particles 90 on the sidewalls 60A-60D. Each one of the sidewalls 60A-60D can include its own circuit 80, or more than one of the sidewalls 60A-60D can have connected circuits 80. The circuit 80 can be connected to the controller 42, and can receive current from the controller 42, or from any other suitable current source. The controller 42 is configured to measure resistance of the circuit 80. The circuit 80 can be connected to the controller 42 with any suitable wired or wireless connection. The resistance of the circuit 80 can be measured in any other suitable manner as well, and the resistance measurements can be input to the controller 42 in any suitable manner.

The circuit 80 is arranged in any suitable manner to measure changes in resistance of the particular sidewall or sidewalls 60A-60D that the circuit 80 is associated with. For example, the circuit 80 can be printed onto or into the sidewalls 60A-60D in any suitable manner, such as with any suitable printer, including a three-dimensional printer. The circuit 80 can also be applied as any suitable coating onto and/or into the sidewalls 60A-60D. The circuit 80 can also be attached to the sidewalls 60A-60D in any suitable manner. For example, the circuit 80 can be printed on an insert (such as insert 82 of FIG. 3B), which is attached to the sidewalls 60A-60D in any suitable manner, such as with any suitable adhesive.

The controller 42 can be any suitable controller, such as an engine control unit. The controller 42 may refer to, be part of, or include processor hardware (shared, dedicated, or group) that executes code and memory hardware (shared, dedicated, or group) that stores code executed by the processor hardware. The code is configured to provide the features of the controllers described herein. For example, the controller 42 is configured to monitor changes in resistance of the circuit 80, as well as power the circuit 80. The controller 42 can be connected to the circuit 80 with any suitable wired or wireless connection. The controller 42 is configured to monitor resistance of the circuit 80 to determine when the resistance exceeds a predetermined resistance threshold.

The resistance of the circuit 80 increases as the particles 90 accumulate on the sidewalls 60A-60D associated with the circuit, thereby decreasing efficiency of the substrate 20. An increase in resistance of the circuit 80 is thus proportional to a decrease in efficiency of the substrate 20. The predetermined resistance threshold can thus be set to a level corresponding to an undesirable level of efficiency of the substrate 20. The threshold can be any suitable level depending on the particular application and configuration of the substrate 20.

When the resistance of the circuit 80 exceeds the predetermined threshold, the controller 42 is configured to initiate regeneration of the substrate 20. Regeneration is the process of removing the accumulated particles 90 from the substrate 20, which improves efficiency of the filter. Any suitable regeneration process can be used, such as any suitable active or passive regeneration, to burn off the accumulated particles 90. For example, active regeneration can include heating the substrate 20 with any suitable heater 40. The heater 40 can be controlled by the controller 42. When the predetermined resistance threshold is reached or exceeded, the controller 42 can activate the heater 40 to heat the substrate 20 and burn off the particles 90.

Passive regeneration can include operating the engine 30 in any manner sufficient to increase the temperature of exhaust gas flowing through the substrate 20 to a temperature sufficient to burn off the particles 90. The engine 30 can be controlled by the controller 42. When the predetermined resistance threshold is reached or exceeded, the controller 42 can operate the engine 30 in any suitable manner to increase temperature of the exhaust gas to burn off the particles 90, such as by increasing the horsepower of the engine 30 for example.

Regeneration can also be promoted by including a catalyst with the substrate 20. The catalyst can be any catalyst suitable for regenerating the substrate 20 by reducing the ignition temperature necessary to oxidize the particles 90. Exemplary catalysts include, but are not limited to, platinum, palladium, rhodium, cerium, iron, manganese, nickel, and copper. Thus when a catalyst is used the controller 42 need not increase the temperature of the exhaust as much as when a catalyst is not used.

Figure 3:
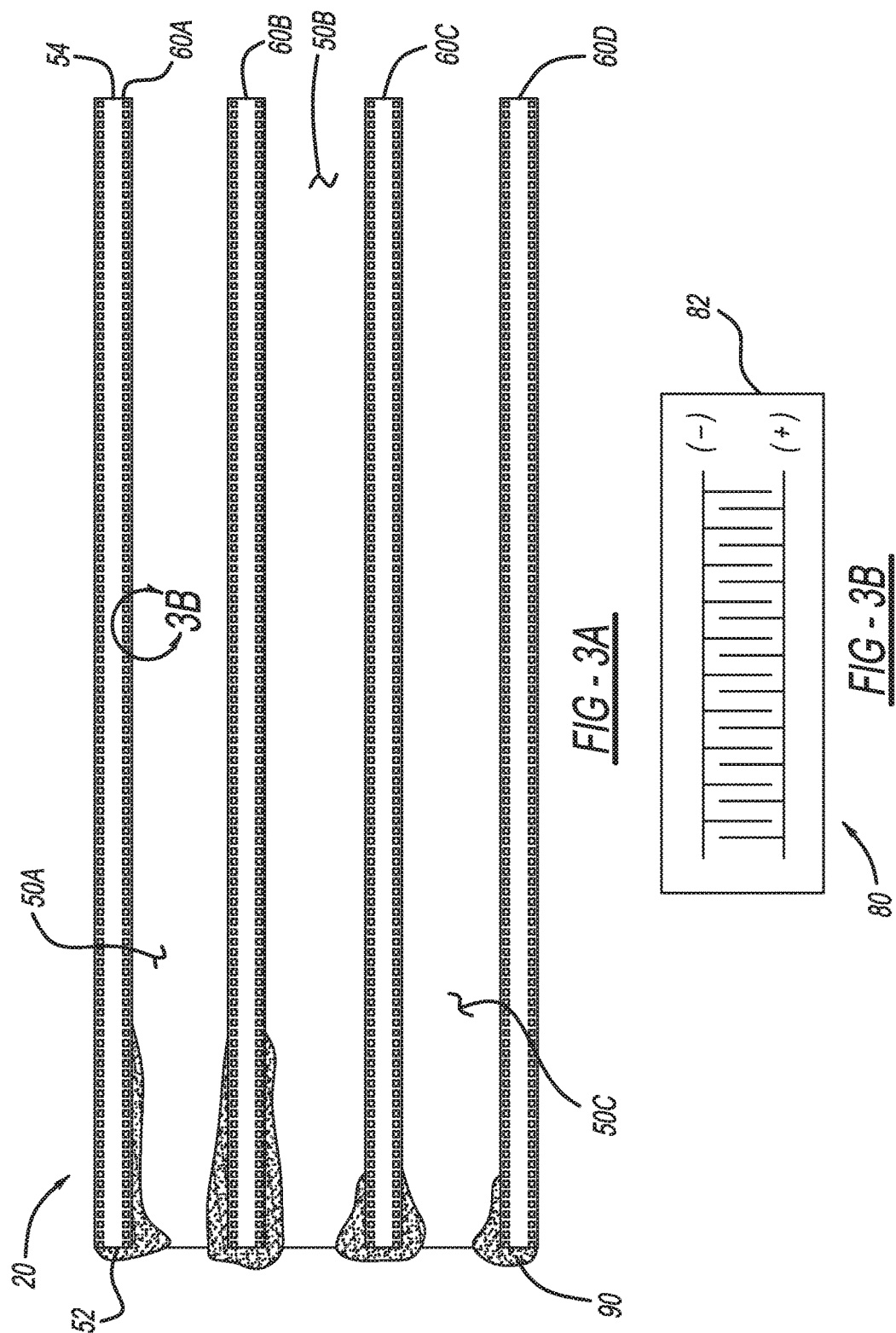
FIG. 3A is a cross-sectional view of channels of an emissions control substrate according to the present teachings.
FIG. 3B illustrates a circuit according to the present teachings at area 3B of FIG. 3A.

With reference to FIGS. 3A and 3B, the substrate 20 can also be configured as a catalytic converter substrate, which need not include plugs 70A-70C. The substrate 20 can thus include a metallic layer having any catalyst suitable for catalyzing a redox reaction to treat toxic pollutants in exhaust gas prior to release of the exhaust to the atmosphere. For example, the catalyst can be any catalyst suitable to convert carbon monoxide, hydrocarbons, and nitrogen oxides to carbon dioxide, water vapor, and nitrogen gas, for example. The metallic layer can be included on and/or in the sidewalls 60A-60D in any suitable manner, such as by printing (including three-dimensional printing) or with a wash coat. With reference to FIG. 3B, the circuit 80 can be provided on an insert 82 secured to the sidewalls 60A-60D in any suitable manner. The insert 82 is particularly useful when the metallic catalyst is applied as a wash coat because the wash coat may make it difficult to print the circuit 80 on the sidewall 60A-60D.

As illustrated in FIG. 3A, the particles 90 may accumulate at an upstream end, such as at the first end 52, when the substrate is configured as a catalytic converter substrate. The diesel particulate filter substrate 20 may also experience accumulation at the first end 52. The particles 90 may be removed from the first end 52 during regeneration in the same manner described above with respect to the particles of FIG. 2A located proximate to the second end 54. For example, when the resistance of the circuit 80 is at or above the predetermined threshold, the controller 42 can activate any suitable heater 40, and/or configure the engine 30, to increase the temperature of the exhaust to burn off the particles 90 at and proximate to the first end 52.

Figure 4:
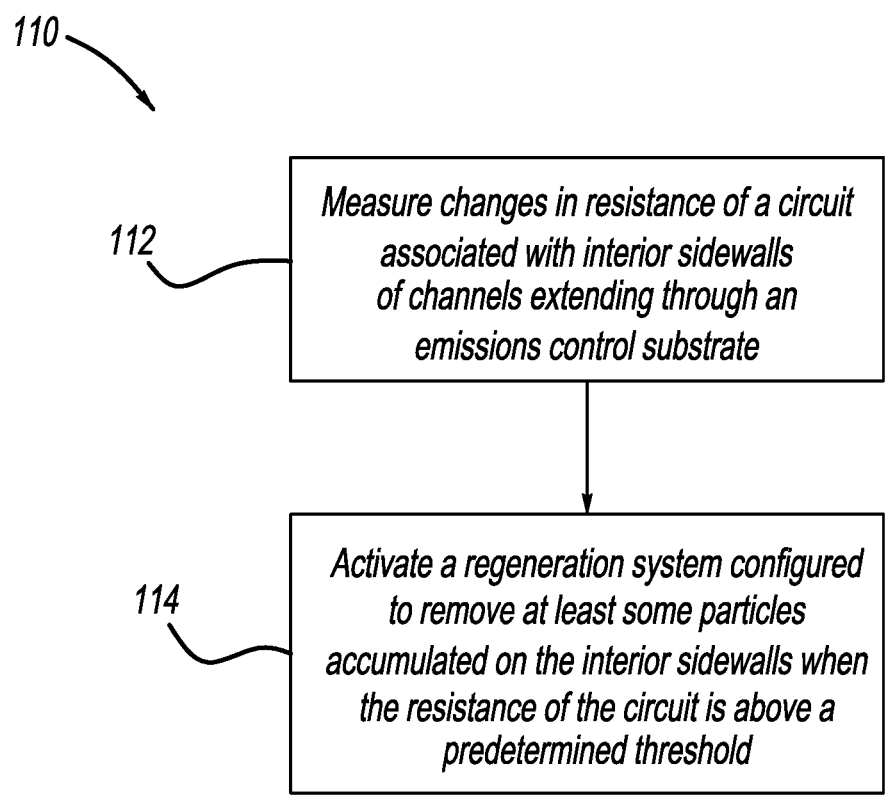
FIG. 4 illustrates a method for monitoring efficiency of the emissions control substrate.

FIG. 4 illustrates a method 110 for monitoring efficiency of any suitable emissions control substrate, such as the substrate 20. Although the method 110 is described in conjunction with the substrate 20, the method 110 can be used to monitor the efficiency of any other suitable emissions control substrate as well. With reference to block 112, the controller 42 measures changes in resistance of the circuit 80 associated with the interior sidewalls 60A-60D defining channels 50 extending through the substrate 20. With reference to block 114, the controller 42 activates the regeneration system when resistance of the circuit 80 is above a predetermined threshold. The regeneration system is configured to remove at least some of the particles 90 accumulated on the interior sidewalls.

The present teachings thus advantageously provide for the emissions control substrate 20 having the circuit 80 that increases in resistance as particles 90 accumulate on the substrate 20. The particles 90 reduce the efficiency of the emissions control substrate 20, and thus as the resistance increases, the efficiency of the substrate 20 decreases. When the controller 42 identifies the resistance as having increased above a predetermined threshold, the controller 42 initiates regeneration of the substrate to burn off the particles 90. Any suitable regeneration can be used, such as activation of heater 40 or any other suitable heating device, or operation of the engine 30 to increase exhaust temperature.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An emissions control substrate comprising:
   a first end and a second end opposite to the first end;
   a plurality of channels defined by interior sidewalls, the channels extending between the first end and the second end and configured to direct exhaust from an engine through the emissions control substrate; and
   a circuit arranged within the interior sidewalls and extending continuously along lengths of the interior sidewalls, the circuit changes resistance in response to accumulation of particles on the interior sidewalls that inhibit flow of exhaust through the emissions control substrate.

2. The emissions control substrate of claim 1, wherein the emissions control substrate is a catalytic converter.

3. The emissions control substrate of claim 1, wherein the emissions control substrate is a particulate matter filter.

4. The emissions control substrate of claim 1, wherein the interior sidewalls are ceramic sidewalls that are permeable to exhaust; and
   wherein the circuit is printed within the interior sidewalls.

5. The emissions control substrate of claim 1, wherein at least some of the plurality of channels include plugs along lengths thereof configured to restrict flow of exhaust through the plugs and force exhaust through the interior sidewalls to adjacent ones of the plurality of channels; and
    wherein the circuit is a coating within the interior sidewalls.

6. The emissions control substrate of claim 1, wherein:
    the interior sidewalls of the plurality of channels include ceramic; and
    a metallic layer on the interior sidewalls includes a metallic catalyst configured to catalyze at least one of: particulate matter filter regeneration; and conversion of carbon monoxide, hydrocarbons, and nitrogen oxides to carbon dioxide, water vapor, and nitrogen gas.

7. The emissions control substrate of claim 6, wherein the interior sidewalls include cordierite, and the metallic catalyst includes a precious metal including at least one of the following: platinum; palladium; rhodium; cerium; iron; manganese; nickel; and copper.

8. The emissions control substrate of claim 1, wherein the particles include at least one of manganese, sulfur, particulate matter, ash, soot, dust, fumes, and smog.

9. An emissions control system comprising:
    an emissions control substrate including:
        a plurality of channels defined by interior sidewalls, the channels are configured to direct exhaust from an engine through the emissions control substrate; and
        a circuit arranged on the interior sidewalls and extending continuously along lengths of the interior sidewalls, the circuit changes resistance in response to accumulation of particles on the interior sidewalls that inhibit flow of exhaust through the emissions control substrate;
    a controller configured to measure resistance of the circuit; and
    a regeneration system for removing at least a portion of the particles from the emissions control substrate;
    wherein the controller is configured to activate the regeneration system when the resistance of the circuit is above a predetermined threshold.

10. The emissions control system of claim 9, wherein the emissions control substrate is a catalytic converter or a particulate matter filter; and
    wherein the circuit is printed on the interior sidewalls.

11. The emissions control system of claim 9, wherein the particles include at least one of manganese, sulfur, particulate matter, ash, soot, dust, fumes, and smog; and
    wherein the circuit is coated on the interior sidewalls.

12. The emissions control system of claim 9, wherein the circuit is at least one of mounted to the interior sidewalls, incorporated within the interior sidewalls, and coated on the interior sidewalls.

13. The emissions control system of claim 9, wherein the regeneration system is configured to burn off the particles from the emissions control substrate with at least one of a heater and exhaust gas.

14. A method for monitoring efficiency of an emissions control substrate, the method comprising;
    measuring changes in resistance of a circuit arranged within interior sidewalls of channels extending through an emissions control substrate, the circuit extending continuously along lengths of the interior sidewalls, the changes in resistance due to accumulation of particles on the interior sidewalls that inhibit flow of exhaust through the emissions control substrate; and
    activating a regeneration system configured to remove at least a portion of the particles from the emissions control substrate when the resistance of the circuit is above a predetermined threshold.

15. The method of claim 14, wherein activating the regeneration system includes at least one of activating a heater and increasing temperature of exhaust directed through the emissions control substrate to burn off at least the portion of the particles; and
    wherein the circuit is printed within the interior sidewalls.

16. The method of claim 14, wherein the emissions control substrate is one of a catalytic converter or a particulate matter filter.

17. The method of claim 14, further comprising measuring the changes in resistance and activating the regeneration system with a controller; and
    wherein the circuit is a coating within the interior sidewalls.

* * * * *